No. 753,686. PATENTED MAR. 1, 1904.
W. L. DURDEN.
NUT LOCK.
APPLICATION FILED JULY 13, 1903.
NO MODEL.
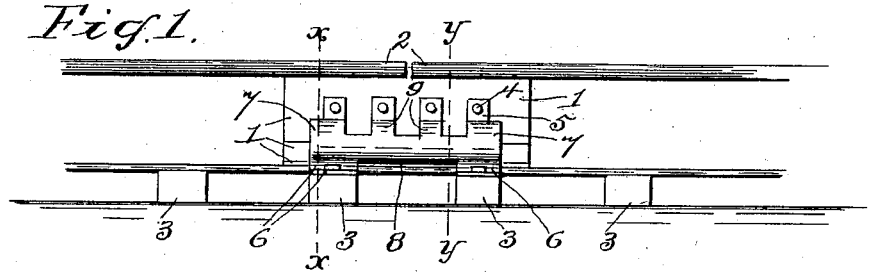
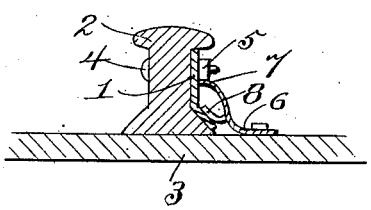 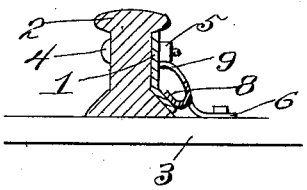
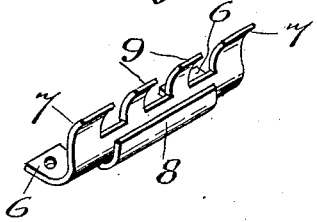 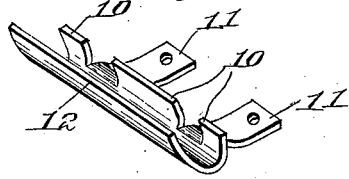
Witnesses
V. A. Whitman
L. Money
Inventor
Washington L. Durden
By C. A. Peek
Attorney No. 753,686. Patented March 1, 1904.

UNITED STATES PATENT OFFICE.

WASHINGTON L. DURDEN, OF PETERMAN, ALABAMA, ASSIGNOR OF ONE-HALF TO JOHN J. KING, OF CONSUL, ALABAMA, AND CHARLES F. HANNON, OF MONTGOMERY, ALABAMA.

NUT-LOCK.

SPECIFICATION forming part of Letters Patent No. 753,686, dated March 1, 1904.

Application filed July 13, 1903. Serial No. 165,362. (No model.)

*To all whom it may concern:*

Be it known that I, WASHINGTON L. DURDEN, a citizen of the United States, residing at Peterman, in the county of Monroe and State of Alabama, have invented certain new and useful Improvements in Nut-Locks, of which the following is a specification.

This invention relates to nut-locks, and pertains especially to a locking device for the nuts of railway-rail joints.

The object of the invention is to provide a simple, inexpensive, and durable device for locking the nuts of railway-rail joints of such novel and peculiar construction that the nuts may be turned by an ordinary wrench without removing or displacing the device and yet arranged to hold or lock the nuts against movement or turning on their bolts until operated by the wrench.

A further object of the invention is to provide a spring-locking device adapted to be secured to the railway-ties and having a portion bearing on the fish-plate and a portion engaging the nuts of a railway-rail joint to lock the nuts and to form a cushion between the securing-points of the device and the said nuts.

A still further object of the invention is to provide a nut-lock having a series of spring-fingers fitting under the nuts and a spring-base forming a cushion between the nuts and the securing-points of the lock.

Other objects and advantages will be found in the practical application of the device, as will be hereinafter more fully disclosed.

In the accompanying drawings, forming part of this application, Figure 1 is a side elevation. Fig. 2 is a section on the line X X, Fig. 1. Fig. 3 is a section on the line *y y*, Fig. 1. Fig. 4 is a perspective view of the device detached. Fig. 5 is a perspective view of a modification.

The same numeral references denote the same parts throughout the several views of the drawings.

In the application of the invention, as shown in the drawings, an ordinary fish-plate 1, usual rails 2, and ties 3 are employed, and suitable bolts 4 and nuts 5 perform their well-known function of connecting the rails and fish-plates.

The nut-locking device consists, preferably, of sheet plate metal bent or otherwise formed substantially U-shaped in cross-section and terminates in T-shaped ends. One wing of each of said ends forms a rest or foot 6, which is secured to the ties, and the other wings constitute end spring-fingers 7. Extending from one to the other of the wing-rests 6 is a spring-base 8, which has its bearing on the fish-plates, and two or more fingers 9 intervene the end fingers 7 and project over the spring-base 8 under the nuts 5. The fingers and the base form a cushion between the rests and the nuts, and the latter are held or locked by the spring-pressure of the fingers thereon.

Referring to the modification shown in Fig. 5, the cushion-plate 10 extends the entire length of the device, the spring-rests 11 are struck out of the said plate, and there is a spring-plate 12 extending parallel with and over the cushion-plate and under the nuts to lock them.

In operation the locking device is secured to the ties after the nuts are placed in position. Then the nuts may be tightened or loosened, as desired, by operating them with a suitable wrench, so that the corners of the nuts will depress the spring-fingers in turning the nuts, and the latter are always in engagement with the fingers. The same results are attained by the device shown in the modification.

It is obvious that with either or both devices the cushion is formed between the fish-plate and the nuts, so that should there occur any variation on the rails or in the ties or between the same the cushion and fingers will provide therefor and permit the fingers to keep the nuts locked. The spring feet or rests, fingers, and cushion form a flexible connection between the nuts and the ties, so that any slight movement of the latter will be taken up by said flexibility without releasing or changing the pressure of the fingers on the nuts. Should one or more of the nuts or bolts become disabled, the same may be removed and replaced without removing or adjusting the device, and should occasion demand the fish-plates may be slid from their position and renewed or replaced without disturbing the locking device.

Having thus described my invention, what I claim as new, and desire to secure by Letters Patent, is—

1. A nut-locking device comprising a U-shaped plate the lower portion of which constituting a base and the upper portion being formed into a series of spring-fingers which extend over the base, and the rests extending from the base in the opposite direction to the fingers.

2. A nut-locking device comprising a U-shaped plate terminating in T-shaped ends one wing of which forms a spring-finger and the other wing a rest, a spring-base, and a series of spring-fingers intervening the wing-fingers and extending over the base.

In witness whereof I hereunto set my hand in the presence of two witnesses.

WASHINGTON L. DURDEN.

Witnesses:
J. H. BRANTLEY,
W. T. DANIEL.